US012748025B2

(12) United States Patent
Kim

(10) Patent No.: US 12,748,025 B2
(45) Date of Patent: Sep. 29, 2026

(54) INSPECTION DEVICE FOR DISPLAY APPARATUS

(71) Applicant: SAMSUNG DISPLAY CO., LTD., Yongin-si (KR)

(72) Inventor: Gabtae Kim, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 470 days.

(21) Appl. No.: 18/521,125

(22) Filed: Nov. 28, 2023

(65) Prior Publication Data

US 2024/0302258 A1 Sep. 12, 2024

(30) Foreign Application Priority Data

Mar. 10, 2023 (KR) ........................ 10-2023-0031898

(51) Int. Cl.
*G01N 3/08* (2006.01)
*G01N 3/303* (2006.01)

(52) U.S. Cl.
CPC ............... *G01N 3/303* (2013.01); *G01N 3/08* (2013.01); *G01N 2203/0067* (2013.01); *G01N 2203/0282* (2013.01)

(58) Field of Classification Search
CPC .. G01N 3/303; G01N 3/08; G01N 2203/0067; G01N 2203/0282; G01N 3/30; G01N 3/02; G01N 3/12; G01N 21/88; G01M 7/08; G01M 11/08; H10K 71/70
See application file for complete search history.

(56) References Cited

U.S. PATENT DOCUMENTS

| | | | | |
|---|---|---|---|---|
| 7,766,298 B2 * | 8/2010 | Chang | ...................... | G12B 5/00 367/128 |
| 2009/0165532 A1 * | 7/2009 | Yee | ...................... | G01N 3/303 73/12.09 |
| 2013/0213113 A1 | 8/2013 | Huang et al. | | |

FOREIGN PATENT DOCUMENTS

| | | |
|---|---|---|
| CN | 100543437 | 9/2009 |
| JP | 2015-206663 | 11/2015 |
| KR | 10-1040978 | 6/2011 |
| KR | 10-20110131570 | 12/2011 |
| KR | 10-2016-0000248 | 1/2016 |
| KR | 10-2020-0068706 | 6/2020 |
| KR | 10-2329139 | 11/2021 |
| KR | 10-2022-0012495 | 2/2022 |

* cited by examiner

*Primary Examiner* — Xin Y Zhong
(74) *Attorney, Agent, or Firm* — F. CHAU & ASSOCIATES, LLC

(57) ABSTRACT

An inspection device for a display apparatus includes a support, a jig portion disposed on the support to enable seating of a display panel, an impact portion configured to apply an impact to the display panel, and a movement portion connecting the support and the impact portion to each other and configured to move the impact portion towards the jig portion. The jig portion includes a base plate, a plurality of support portions arranged on the base plate to be detachable from the base plate, and a cover plate arranged over the plurality of support portions and including a plurality of overlapping areas overlapping the plurality of support portions and an evaluation area arranged between the plurality of overlapping areas. An area where the impact portion applies the impact to the display panel overlaps the evaluation area.

20 Claims, 19 Drawing Sheets

INSPECTION DEVICE FOR DISPLAY APPARATUS

CROSS-REFERENCE TO RELATED APPLICATION

This U.S. patent application claims priority under 35 U.S.C. § 119 to Korean Patent Application No. 10-2023-0031898, filed on Mar. 10, 2023, in the Korean Intellectual Property Office, the disclosure of which is incorporated by reference in its entirety herein.

1. TECHNICAL FIELD

Embodiments relate to an inspection device for a display apparatus.

2. DISCUSSION OF THE RELATED ART

A mobile electronic device may be a computer, small enough to be held and operated in the hand. Examples of mobile electronic devices include smartphones, tablet personal computers (PCs).

The mobile electronic device includes a display apparatus for providing a user with visual information, such as images or video. For example, the display apparatus may be a flat liquid-crystal-display (LCD) or an organic-light-emitting-diode (OLED) screen.

Recently, as other parts of the mobile device for driving the display apparatus have become smaller, the proportion occupied by the display apparatus has been gradually increased, and a structure capable of being bent from a flat state by a certain angle has also been developed.

However, a larger display apparatus is more likely to become damaged during an impact. Thus, there is a need for a mechanism to inspect the display apparatus to detect this damage.

SUMMARY

At least one embodiment includes an inspection device for a display apparatus, in which structure changes may be easily made in correspondence with various types of display panels.

At least one embodiment includes an inspective device for a display apparatus, in which various types of impact may be applied to a display panel.

According to an embodiment, an inspection device for a display apparatus includes a support, a jig portion disposed on the support to enable a display panel to be seated thereon, an impact portion configured to apply an impact to the display panel, and a movement portion connecting the support and the impact portion to each other and configured to move the impact portion towards the jig portion. The jig portion includes a base plate, a plurality of support portions arranged on the base plate to be detachable from the base plate, and a cover plate arranged over the plurality of support portions and including a plurality of overlapping areas overlapping the plurality of support portions and an evaluation area arranged between the plurality of overlapping areas. An area where the impact portion applies the impact to the display panel overlaps the evaluation area.

Each of the plurality of support portions may include a first magnet member, wherein each of the base plate and the cover plate may include a metal material.

The jig portion may further include a display portion arranged on the base plate to be detachable from the base plate, wherein the display portion may be marked with graduations displaying positions of the plurality of support portions.

The display portion may include a second magnet member, and the base plate may include a metal material.

The impact portion may include a drop portion configured to drop a falling object onto the display panel.

The drop portion may store a plurality of falling objects at the same time.

At least two of the plurality of falling objects may have different shapes from each other.

The falling object may include a falling tip configured to hit the display panel, and an extension portion extending from the falling tip in one direction.

A single layer may integrally form the falling tip.

The falling tip may include a falling contact portion configured to contact the display panel, and a falling connection portion connecting the falling contact portion and the extension portion to each other and accommodating at least a portion of the falling contact portion.

The falling object may have a sphere shape.

The impact portion may include a pressing portion configured to apply a force to the display panel for a determined period of time.

The pressing portion may include a force sensor including a load cell, a pressing tip configured to contact the display panel, and a pressing movement portion connecting the force sensor and the pressing tip to each other and configured to move the pressing tip in one direction toward the display panel with respect to the force sensor.

The inspection device may further include a controller configured to control the impact portion and the movement portion so that the impact portion applies an impact to the display panel at a previously set position.

The inspection device may further include a driver electrically connected to the display panel and configured to drive the display panel.

The inspection device may further include a measurement portion configured to measure a surface of the display panel after the impact portion applies the impact to the display panel.

The measurement portion may be fixed to the impact portion.

The movement portion may include a first movement portion configured to move the impact portion in a first direction, a second movement portion configured to move the impact portion in a second direction crossing the first direction, and a third movement portion configured to move the impact portion in a third direction crossing the first direction and the second direction.

The jig portion may include an aluminum material.

The display panel may include a rigid area, and a folding area arranged adjacent to the rigid area to be foldable, wherein the evaluation area may include a plurality of evaluation areas, the rigid area may overlap one of the plurality of evaluation areas, and the folding area may overlap another one of the plurality of evaluation areas.

BRIEF DESCRIPTION OF THE DRAWINGS

The above and other aspects and features of certain embodiments of the disclosure will be more apparent from the following description taken in conjunction with the accompanying drawings, in which.

DETAILED DESCRIPTION

Figure 1:
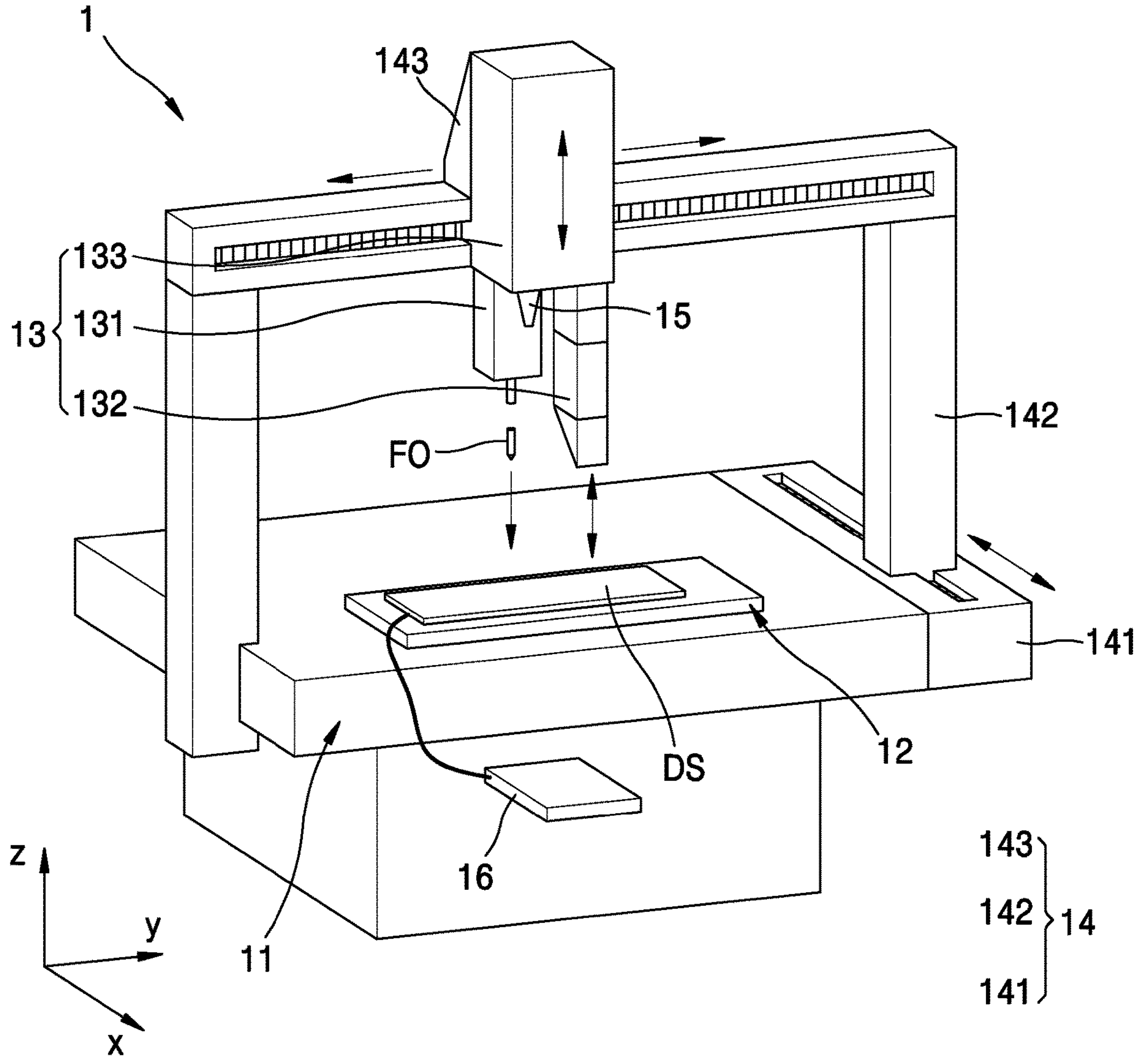
FIG. 1 is a schematic perspective view of an inspection device for a display apparatus, according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Throughout the disclosure, the expression "at least one of a, b or c" indicates only a, only b, only c, both a and b, both a and c, both b and c, all of a, b, and c, or variations thereof.

As the present description allows for various changes and numerous embodiments, certain embodiments will be illustrated in the drawings and described in the written description. Effects and features of one or more embodiments and methods of accomplishing the same will become apparent from the following detailed description of the one or more embodiments, taken in conjunction with the accompanying drawings. However, the present embodiments may have different forms and should not be construed as being limited to the descriptions set forth herein.

One or more embodiments will be described below in more detail with reference to the accompanying drawings. Those elements that are the same or are in correspondence with each other are rendered the same reference numeral regardless of the figure number, and redundant descriptions thereof are omitted.

While such terms as "first" and "second" may be used to describe various elements, such elements are not limited to the above terms. The above terms are used only to distinguish one element from another.

The singular forms "a," "an," and "the" as used herein are intended to include the plural forms as well unless the context clearly indicates otherwise.

It will be further understood that, when a layer, region, or element is referred to as being on another layer, region, or element, it may be directly or indirectly on the other layer, region, or element. That is, for example, intervening layers, regions, or elements may be present.

Sizes of elements in the drawings may be exaggerated or reduced for convenience of explanation. For example, while sizes and thicknesses of elements in the drawings are illustrated for convenience of explanation, the following embodiments are not limited thereto.

While one or more of the drawings use the x-axis, the y-axis, and the z-axis, embodiments of the disclosure are not limited to these three axes of the rectangular coordinate system. For example, the x-axis, the y-axis, and the z-axis may be perpendicular to one another or may represent different directions that are not perpendicular to one another.

A certain process order described herein may be performed differently from the described order. For example, two consecutively described processes may be performed substantially at the same time or performed in an order opposite to the described order.

FIG. 1 is a schematic perspective view of an inspection device 1 for a display apparatus, according to an embodiment.

Referring to FIG. 1, the inspection device 1 for a display apparatus is configured to test performance of a display panel DS by applying an impact to the display panel DS and then measuring a surface of the display panel DS. The performance of the display panel DS may include durability of the display panel DS. For example, the inspection device 1 may measure the ability of the display panel to withstand wear, pressure, or an impact.

The inspection device 1 for a display apparatus includes a support 11 (e.g., a support layer), a jig portion 12 (e.g., a jig layer), an impact portion 13 (e.g., an impact structure), a movement portion 14 (e.g., a movement structure), a measurement portion 15 (e.g., a sensor), a driver 16 (e.g., a driver circuit), and a controller (e.g., a controller circuit).

The support 11 may support the jig portion 12, the impact portion 13, the movement portion 14, and the measurement portion 15. In an embodiment, the support 11 includes a material with high rigidity and may include a flat surface. Accordingly, the support 11 may stably support the jig portion 12.

The jig portion 12 may be disposed on the support 11 and may have the display panel DS seated thereon. A detailed description of the jig portion 12 is given below with reference to FIGS. 9 to 16.

The impact portion 13 may apply an impact to the display panel DS. The impact portion 13 may include a drop portion 131 (e.g., a drop layer), a pressing portion 132 (e.g., a pressing layer), and a connection portion 133 (e.g., a connection layer). The drop portion 131 may drop a falling object FO onto a surface of the display panel DS. The pressing portion 132 may apply a force to the display panel DS for a determined period of time. The impact portion 13 may include at least one of the drop portion 131 and the pressing portion 132.

The connection portion 133 may connect the drop portion 131 and the pressing portion 132 to each other. As the connection portion 133 moves, the drop portion 131 and the pressing portion 132 may also move together. The drop portion 131 and the pressing portion 132 may be fixed to the connection portion 133. In an embodiment of the structure described above, the connection portion 133 and the drop portion 131 do not move relative to each other. For example, the connection portion 133 and the drop portion 131 may move in concert together. However, this is merely an example, and the drop portion 131 and the pressing portion 132 may move independently.

The movement portion 14 may connect the support 11 and the impact portion 13 to each other and may move the impact portion 13 above the jig portion 12. The movement portion 14 may move the impact portion 13 in a first direction (e.g., the x-axis direction), a second direction (e.g., the y-axis direction), and a third direction (e.g., the z-axis direction). In this regard, the first direction (e.g., the x-axis direction), the second direction (e.g., the y-axis direction), and the third direction (e.g., the z-axis direction) may be directions crossing one another. In addition, the third direction (e.g., the z-axis direction) may be a direction parallel to the direction in which gravity acts. The movement portion 14 may include a first movement portion 141 (e.g., a first movement layer), a second movement portion 142 (e.g., a second movement layer), and a third movement portion 143 (e.g., a third movement layer).

The first movement portion 141 may move the impact portion 13 in the first direction (e.g., the x-axis direction). The first movement portion 141 may be fixed to the support 11 and may be connected to the second movement portion 142. The first movement portion 141 may linearly reciprocate the second movement portion 142. For example, the first movement portion 141 may move back and forth in a straight line. The first movement portion 141 may include a linear motor. The second movement portion 142 and the support 11 may be slidably connected to each other. For example, the second movement portion 142 may be configured to slide back and forth in a line within an opening of the first movement portion 141. For example, the line may be arranged in the x-axis direction. As the first movement portion 141 provides power to the second movement portion 142, the second movement portion 142 may move in the first direction (e.g., the x-axis direction) with respect to the support 11.

The second movement portion 142 may move the impact portion 13 in the second direction (e.g., the y-axis direction). The second movement portion 142 may linearly reciprocate the third movement portion 143. The second movement portion 142 may include a linear motor. As the second movement portion 142 provides power to the third movement portion 143, the third movement portion 143 may move in the second direction (e.g., the y-axis direction) with respect to the support 11.

The third movement portion 143 may move the impact portion 13 in the third direction (e.g., the z-axis direction). The third movement portion 143 may linearly reciprocate the connection portion 133. The third movement portion 143 may include a linear motor. As the third movement portion 143 provides power to the connection portion 133, the connection portion 133 may move in the third direction (e.g., the z-axis direction) with respect to the support 11.

In an embodiment, the measurement portion 15 measures a surface of the display panel DS after the impact portion 13 applies an impact to the display panel DS. The measurement portion 15 may be fixed to the impact portion 13. For example, the measurement portion 15 may be fixed to the connection portion 133. Accordingly, as the impact portion 13 moves due to the movement portion 14, the measurement portion 15 may also move together. However, this is merely an example. In an alternate embodiment, the inspection device 1 for the display apparatus does not include the measurement portion 15. For example, a surface of the display panel DS may be directly measured with the naked eye or may be measured through a separate magnifying glass.

For example, the measurement portion 15 may include a separate light (not shown). In the structure described above, as the separate light (not shown) emits light toward a surface of the display panel DS, the measurement portion 15 may measure the surface of the display panel DS more accurately. However, this is merely an example. In an alternate embodiment, the measurement portion 15 does not include the separate light.

The driver 16 may be electrically connected to the display panel DS and may drive the display panel DS. The driver 16 may supply power to the display panel DS. In an embodiment, the driver 16 causes a light-emitting material included in the display panel DS to emit light. Accordingly, an image may be displayed on a surface of the display panel DS.

The controller may control the impact portion 13, the movement portion 14, the measurement portion 15, and the driver 16 such that the impact portion 13 applies an impact to the display panel DS at a previously set position and the measurement portion 15 measures a surface of the display panel DS.

The display panel DS may be seated on a jig. An operation of seating the display panel DS on a jig will be described below in more detail with reference to FIGS. 9 and 16.

The controller may receive an input of a position where an impact is to be applied to the display panel DS. That is, a position at which the impact portion 13 applies an impact to the display panel DS may be previously set.

The controller may control the movement portion 14 so that the impact portion 13 applies an impact to the display panel DS at a previously set position. That is, the movement portion 14 may move the impact portion 13 such that the impact portion 13 is disposed over the previously set position. The previously set position may include a plurality of previously set positions. In this case, the movement portion 14 may move the impact portion 13 along a determined path to pass over the plurality of previously set positions.

The controller may control the impact portion 13 to apply an impact to the display panel DS. For example, the controller may control the drop portion 131 such that the drop portion 131 drops the falling object FO onto a surface of the display panel DS. Alternatively, the controller may control the pressing portion 132 such that the pressing portion 132 applies a force to a surface of the display panel DS for a determined period of time.

In an embodiment, the driver 16 drives the display panel DS to display a black pattern while the drop portion 131 drops the falling object FO onto the display panel DS. The measurement portion 15 may measure whether a bright spot occurs on a surface of the display panel DS or not. For example, the measurement portion 15 may measure whether the bright spot occurs after the falling object FO has been dropped. In an embodiment when a bright spot is not measured on the surface of the display panel DS, the movement portion 14 increases a height of the impact portion 13 by moving the impact portion 13 in the third direction (e.g., the z-axis direction). In addition, the drop portion 131 may drop the falling object FO to the display panel DS again. For example, the drop portion 131 may drop the falling object FO again when the bright spot is not measured. For example, the movement portion 14 may increase a height of the impact portion 13 by a same unit (e.g., 1 centimeter (cm)) each time the bright spot does not occur. When the bright spot occurs on the surface of the display panel DS, the durability of the display panel DS may be evaluated by measuring a height of the impact portion 13.

In a state where the driver 16 does not drive the display panel DS, the drop portion 131 may drop the falling object FO to the display panel DS. The measurement portion 15 may measure or detect whether a crack occurs on a surface of the display panel DS or not. When a crack is not measured or detected on the surface of the display panel DS, the movement portion 14 may increase a height of the impact portion 13 by moving the impact portion 13 in the third direction (e.g., the z-axis direction). In addition, the drop portion 131 may drop the falling object FO to the display panel DS again. When a crack occurs on the surface of the display panel DS, the durability of the display panel DS may be evaluated by measuring a height of the impact portion 13.

The controller may receive an input of v1, which is a speed at which the pressing portion 132 presses the display panel DS, F1, which is a pressing force, and t1, which is a pressing time. The pressing portion 132 may press the display panel DS at a speed of v1 until a force pressing the display panel DS reaches F1. When a force of the pressing portion 132 pressing the display panel DS reaches F1, the pressing portion 132 may maintain a stationary state during t1. In an embodiment when a time of t1 elapses, the pressing portion 132 moves to be out of contact with the display panel DS.

For example, v1 may be 6 millimeters per second (mm/s), and t1 may be 2 seconds (s). In addition, F1 may be 400 gram-force (gf). After the pressing portion 132 presses the display panel DS, the measurement portion 15 may measure damage to the display panel DS, such as whether a shape of the pressing portion 132 remains on the display panel DS or not and whether a bright spot or a crack has occurred or not. When damage to the display panel DS is not measured, F1 may be increased by a certain unit (e.g., 100*gf*, 200*gf*, etc.). Whan damage occurs to a surface of the display panel DS, the durability of the display panel DS may be evaluated by measuring F1.

In a process of manufacturing the display panel DS, an appearance waste product irrelevant to defects in an emission layer and a cover window may occur. For example, an appearance waste product due to a dent in an outer frame or the like may occur. The display panel DS to be inspected by the inspection device 1 for a display apparatus may include such an appearance waste product. That is, in a process of manufacturing the display panel DS, a separate line for selecting only the appearance waste product and returning the same to the inspection device 1 for a display apparatus may be arranged.

Figure 2:
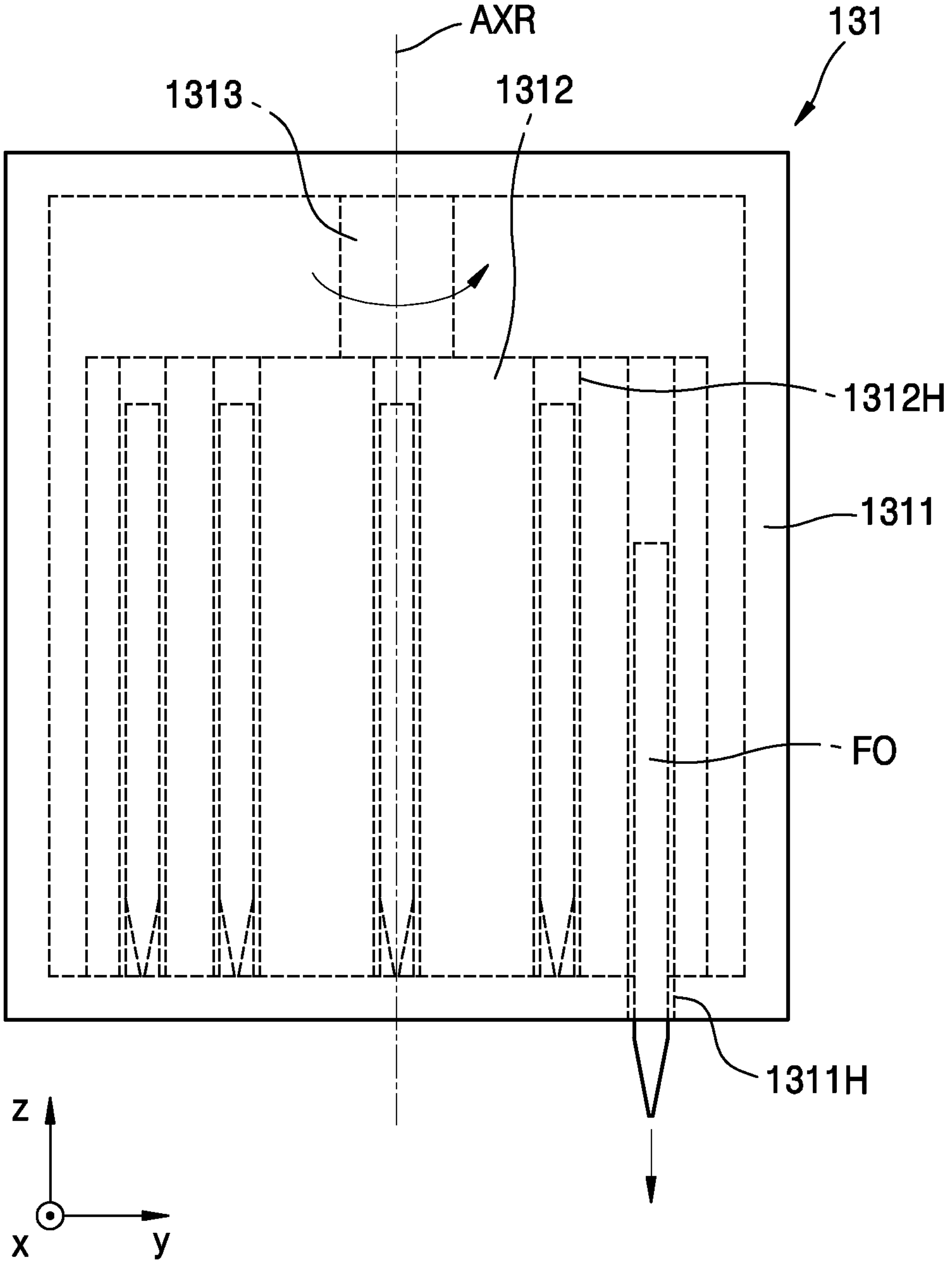
FIG. 2 is a schematic front view of a drop portion according to an embodiment.
Figure 3:
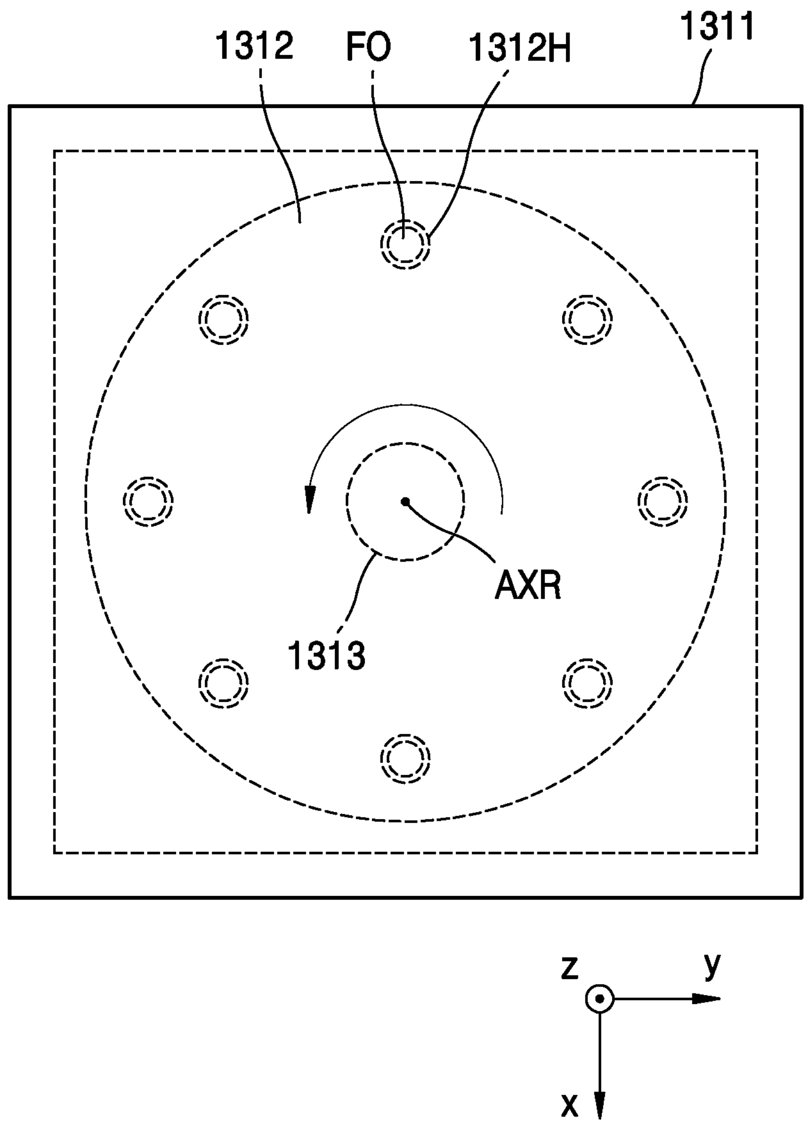
FIG. 3 is a schematic plan view of a drop portion according to an embodiment.

FIG. 2 is a schematic front view of the drop portion 131 according to an embodiment. FIG. 3 is a schematic plan view of the drop portion 131 according to an embodiment.

Referring to FIGS. 2 and 3, the drop portion 131 includes a drop frame 1311, a storage portion 1312 (e.g., a storage layer), and a power portion 1313 (e.g., a power layer). In FIGS. 2 and 3, portions invisible from the outside due to the drop frame 1311 are denoted by dashed lines.

The drop frame 1311 may constitute the appearance of the drop portion 131. The drop frame 1311 may provide an internal space. For example, empty space may be present in an interior of the drop frame 1311. The storage portion 1312 and the power portion 1313 may be arranged in the internal space of the drop frame 1311. An ejection hole 1311H may be arranged at one side of the drop frame 1311. The ejection hole 1311H may pass through the drop frame 1311. The ejection hole 1311H may be arranged at the bottom of the drop frame 1311 and may have a third direction (e.g., the z-axis direction). In FIGS. 2 and 3, a shape of the drop frame 1311 is shown as a hexahedron, but this is merely an example. For example, a shape of the drop frame 1311 is not limited to a hexahedron.

The storage portion 1312 may store the falling object FO. The storage portion 1312 may store a plurality of falling objects FO at the same time. At least two of the falling objects FO stored in the storage portion 1312 may have different shapes from each other. A storage hole 1312H accommodating the falling object FO may be arranged in the storage portion 1312. The storage hole 1312H may be arranged in the third direction (e.g., the z-axis direction) and may have a shape corresponding to that of the falling object FO. The storage portion 1312 may include a plurality of storage holes 1312H.

The power portion 1313 may be configured to rotate the storage portion 1312 about a rotation axis AXR. The power portion 1313 may connect the drop frame 1311 and the storage portion 1312 to each other. In an embodiment, one side of the power portion 1313 is fixed to the drop frame 1311, and the other side of the power portion 1313 is fixed to the storage portion 1312. For example, the power portion 1313 may rotate the storage portion 1312 in the third direction (e.g., the z-axis direction).

In an embodiment, a distance from the rotation axis AXR to the plurality of storage holes 1312H of the storage portion 1312 and a distance from the rotation axis AXR to the ejection hole 1311H of the drop frame 1311 are the same as each other. In addition, planar shapes of the storage hole 1312H of the storage portion 1312 and the ejection hole 1311H of the drop frame 1311 may correspond to each other. In this structure, as the storage portion 1312 is rotated about the rotation axis AXR, one of the plurality of storage holes 1312H may overlap the ejection hole 1311H. In this regard, the falling object FO accommodated in the storage hole 1312H overlapping the ejection hole 1311H may drop in the third direction (e.g., the z-axis direction) due to gravity.

In this structure, the drop portion 131 may store a plurality of falling objects FO at the same time. In addition, at least two of the plurality of falling objects FO stored in the drop portion 131 may have different shapes from each other. In other words, the drop portion 131 may store several types of falling objects FO at the same time and may drop the falling object FO required according to necessity. Accordingly, a time for the falling object FO to be loaded into the drop portion 131 may be shortened.

FIGS. 4 to 7 are schematic front views of the falling object FO according to an embodiment.

Figure 4:
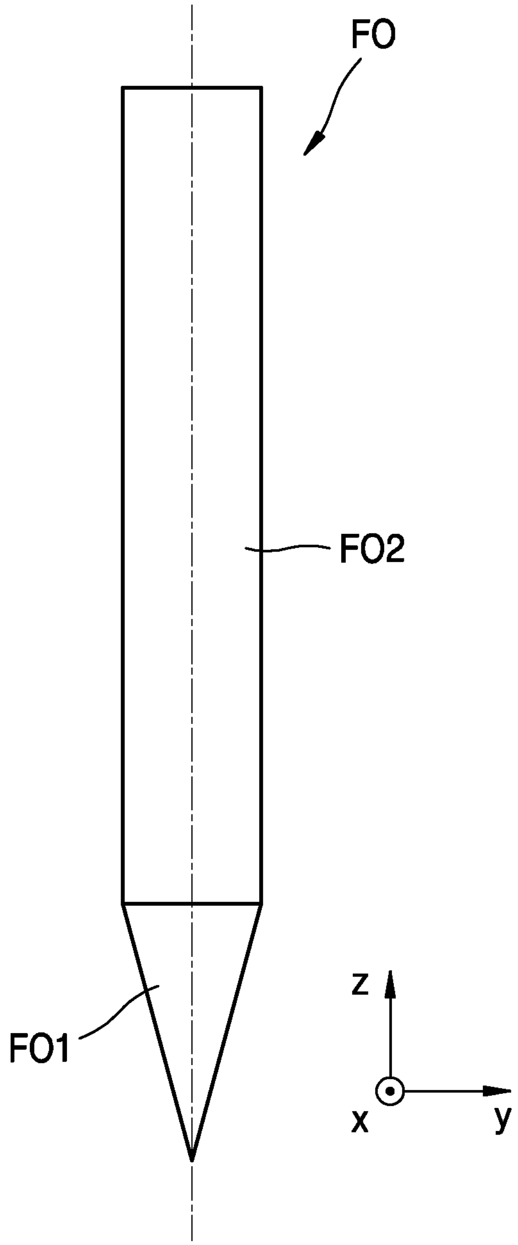
FIGS. 4 to 7 are schematic front views of a falling object according to an embodiment.
Figure 5:
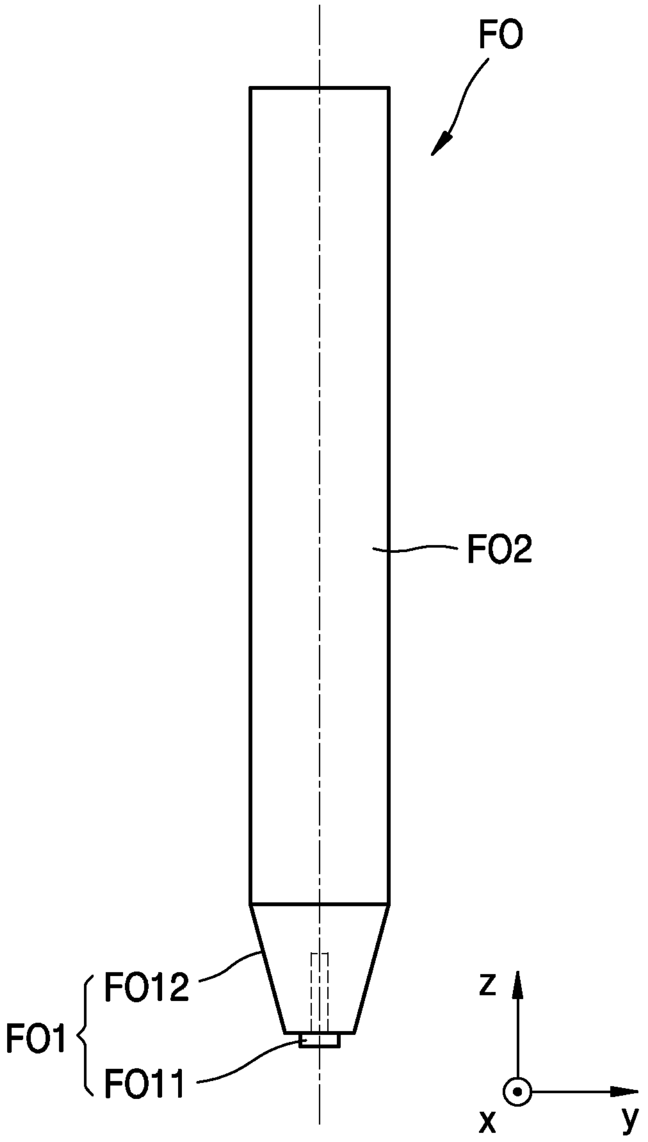
Figure 6:
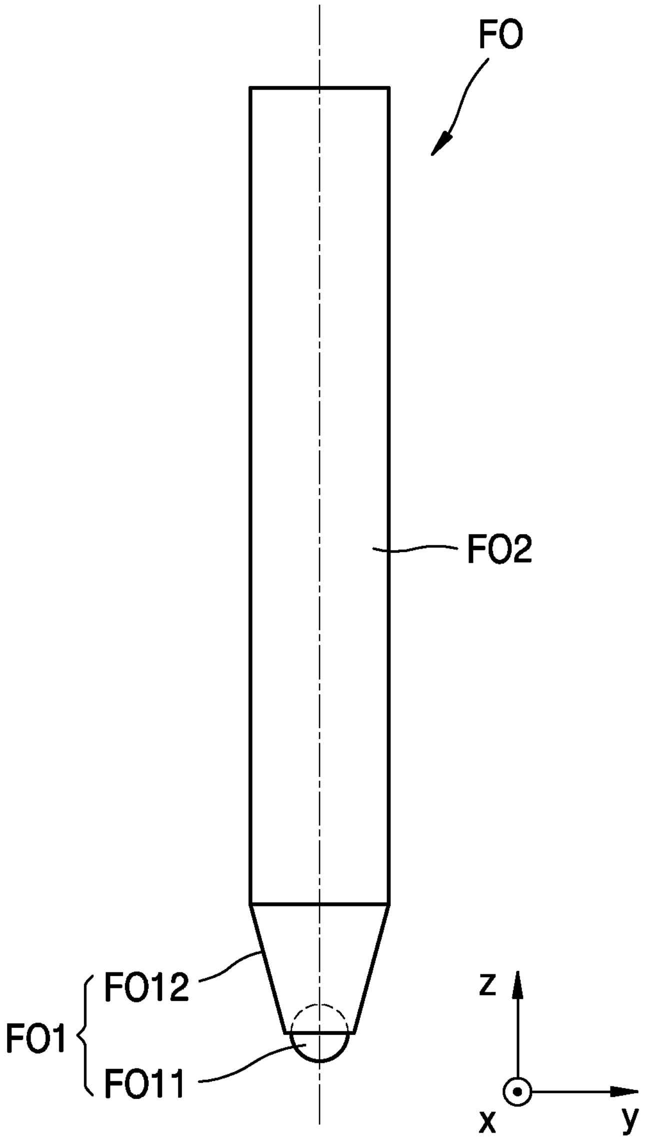

Referring to FIGS. 4 to 6, in an embodiment, the falling object FO includes a falling tip FO1 and an extension portion FO2.

The falling tip FO1 may hit the display panel DS. The extension portion FO2 may extend from the falling tip FO1 in one direction (e.g., a third direction (e.g., the z-axis direction)). In this structure, the falling object FO may have a pen shape. Accordingly, in the inspection device 1 (refer to FIG. 1) for a display apparatus, a pen drop phenomenon may be reproduced. The falling tip FO1 may have various shapes.

For example, as shown in FIG. 4, the falling tip FO1 may be integrally provided. For example, a single layer may be used to form the falling tip FO1. For example, as shown in FIGS. 5 and 6, the falling tip FO1 may include a falling contact portion FO11 and a falling connection portion FO12. The falling contact portion FO11 may come into contact with the display panel DS. The falling connection portion FO12 may connect the falling contact portion FO11 and the extension portion FO2 to each other. At least a portion of the falling contact portion FO11 may be accommodated in the falling connection portion FO12. As shown in FIG. 5, the falling contact portion FO11 and the falling connection portion FO12 may implement or simulate a lead insertion type pen tip. As shown in FIG. 6, the falling contact portion FO11 and the falling connection portion FO12 may implement or simulate a ball insertion type pen tip.

Figure 7:
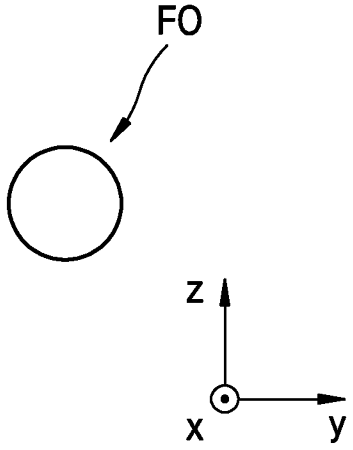

However, these are merely examples, and a shape of the falling object FO is not limited thereto. For example, as shown in FIG. 7, the falling object FO may have a simple sphere shape, or the falling object FO may be a pen actually used.

Figure 8:
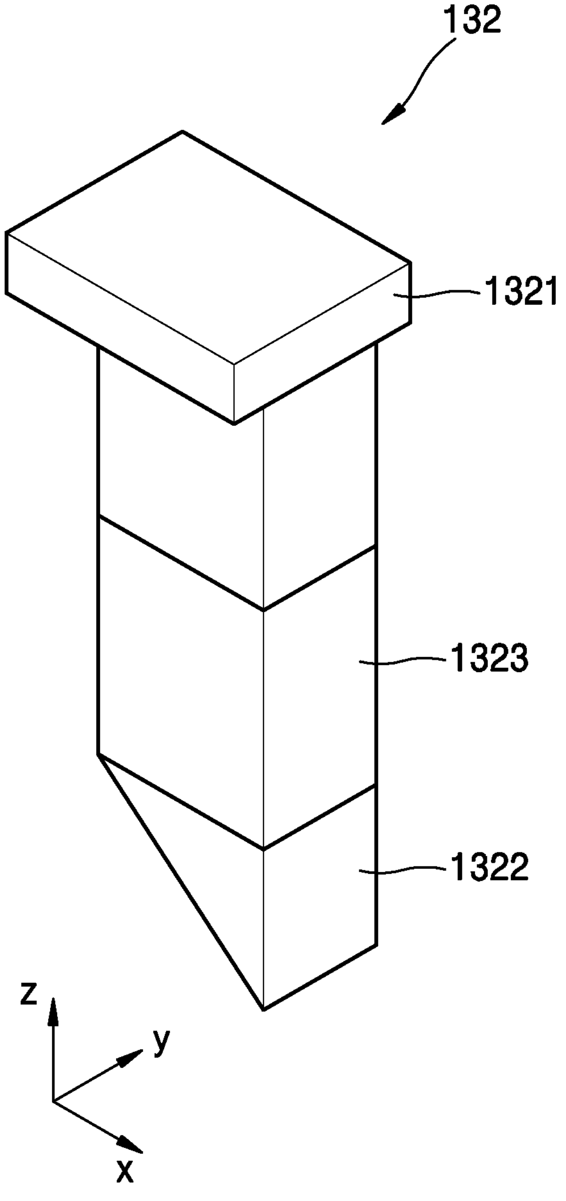
FIG. 8 is a schematic perspective view of a pressing portion according to an embodiment.

FIG. 8 is a schematic perspective view of the pressing portion 132 according to an embodiment.

Referring to FIG. 8, the pressing portion 132 includes a force sensor 1321, a pressing tip 1322, and a pressing movement portion 1323.

The force sensor 1321 may include a load cell configured to sense force. The force sensor 1321 may be fixed to the connection portion 133. The pressing tip 1322 may come into contact with the display panel DS. In an embodiment, one side of the pressing tip 1322 has a fingernail shape. Accordingly, the pressing portion 132 may implement or simulate a phenomenon of pressing the display panel DS with a fingernail. The pressing movement portion 1323 may connect the force sensor 1321 and the pressing tip 1322 to each other and may move the pressing tip 1322 in one direction toward the display panel DS (e.g., a third direction (e.g., the z-axis direction)) with respect to the force sensor 1321. During a process in which the display panel DS is pressed as the pressing movement portion 1323 moves the pressing tip 1322, the force sensor 1321 may measure a force applied to the display panel DS as a counteraction thereof. For example, the force sensor 1321 may measure the force applied to the display panel DS as a result of the pressing tip 1322 contacting the display panel DS. The pressing tip 1322 may have one sloped side that meets a vertical side, but is not limited thereto.

FIGS. 9 to 16 are diagrams for describing an operation of seating the display panel DS on the jig portion 12, according to an embodiment.

Referring to FIGS. 9 to 16, the jig portion 12 may include a base plate 121, a display portion 122, a support portion 123, and a cover plate 124. The jig portion 12 may include a metal material. For example, the jig portion 12 may include an aluminum material. That is, the base plate 121, the display portion 122, the support portion 123, and the cover plate 124 may include a metal material. For example, the base plate 121, the display portion 122, the support portion 123, and the cover plate 124 may include an aluminum material.

Figure 9:
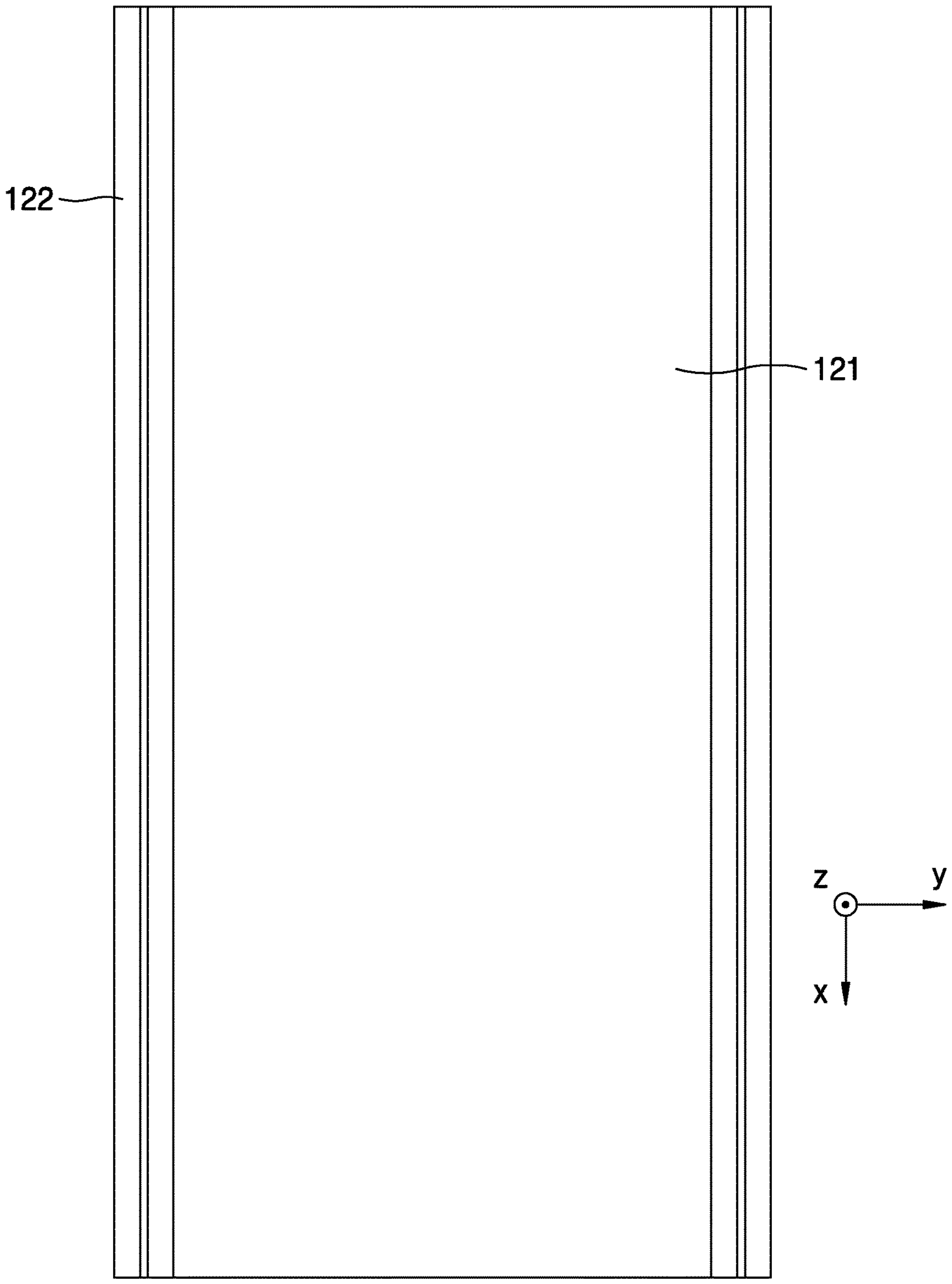
FIGS. 9 to 16 are diagrams for describing an operation of seating a display panel on a jig portion, according to an embodiment.
Figure 10:
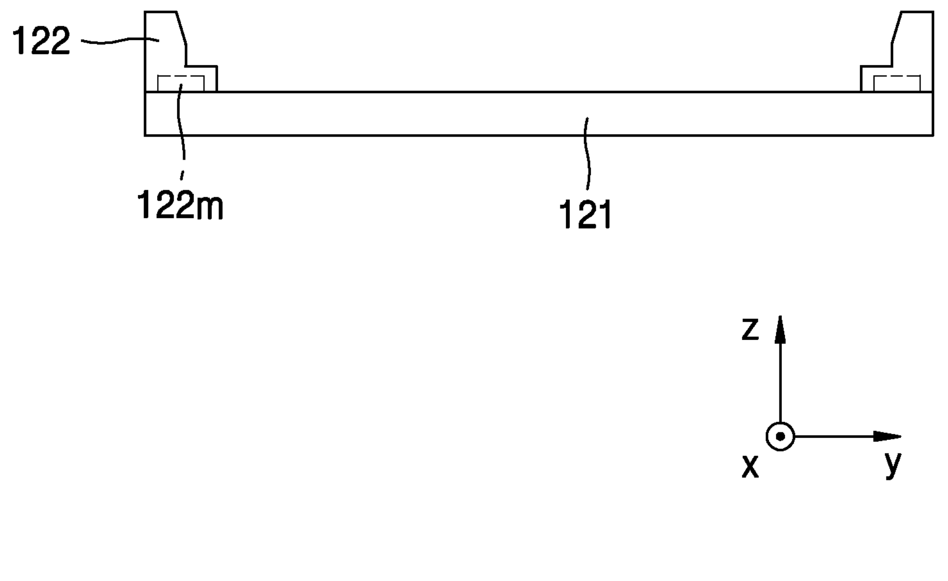

First, referring to FIGS. 9 and 10, the display portion 122 may be formed on the base plate 121.

The base plate 121 may support the display portion 122, the support portion 123, and the cover plate 124. The base plate 121 may be fixed to the support 11. The base plate 121 may have a plate shape or a rectangular shape. In FIGS. 9 to 16, the base plate 121 is shown in a hexahedral shape, but this is merely an example as a shape of the base plate 121 is not limited thereto.

The display portion 122 may be disposed on the base plate 121 to be detachable from the base plate 121. In an embodiment, the display portion 122 includes a second magnet member 122*m*. For example, the second magnet member 122*m* may be arranged inside the display portion 122. Due to the second magnet member 122*m*, magnetic force may be formed between the base plate 121 and the display portion 122. That is, an attractive force may act between the base plate 121 and the display portion 122. Accordingly, the display portion 122 and the base plate 121 may be detachably fixed to each other.

The display portion 122 may extend in a first direction (e.g., the x-axis direction). In an embodiment, a length of the base plate 121 in the first direction (e.g., the x-axis direction) and a length of the display portion 122 in the first direction (e.g., the x-axis direction) correspond to each other. Two display portions 122 may be present, and the two display portions 122 may be spaced apart from each other side by side in a second direction (e.g., the y-axis direction). In this structure, the display portion 122 may protrude from the base plate 121 in a third direction (e.g., the z-axis direction), and a separation space may be formed between the two display portions 122.

Figure 11:
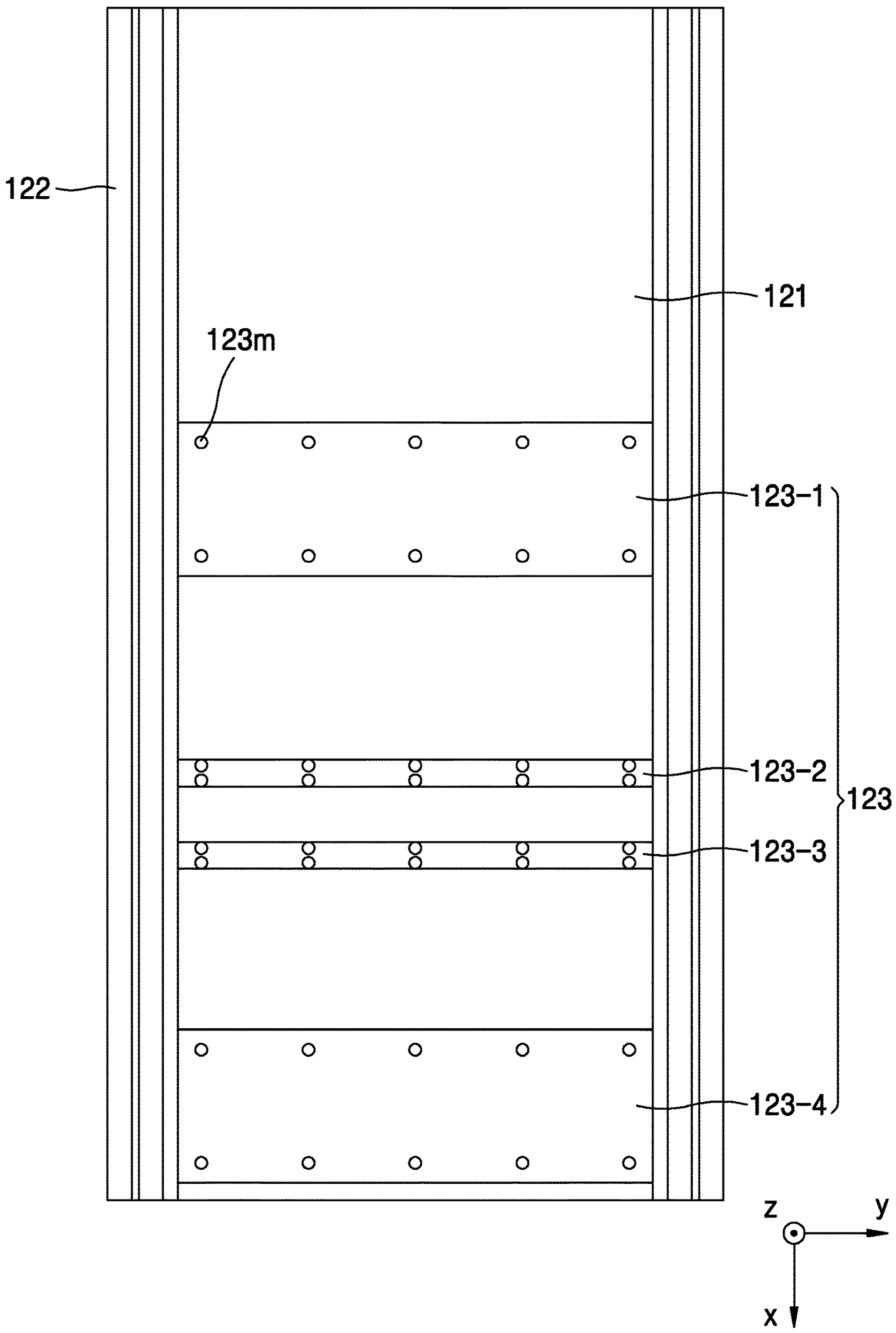
Figure 12:
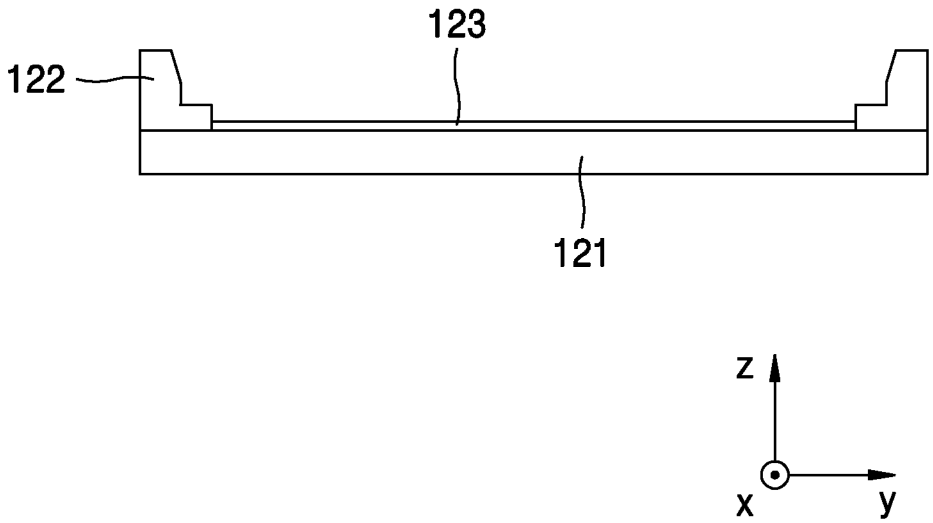

Referring to FIGS. 11 and 12, the support portion 123 may be disposed on the base plate 121 to be detachable from the base plate 121. In an embodiment, the support portion 123 includes a first magnet member 123*m*. There may be a plurality of first magnet members 123*m*. For example, the first magnet member 123*m* may be arranged inside the support portion 123. Due to the first magnet member 123*m*, magnetic force may be formed between the base plate 121 and the support portion 123. That is, an attractive force may act between the base plate 121 and the support portion 123. Accordingly, the support portion 123 and the base plate 121 may be detachably fixed to each other.

The support portion 123 may have a plate shape or a rectangular shape. In an embodiment, a length of the support portion 123 in the second direction (e.g., the y-axis direction) and a distance between the two display portions 122 correspond to each other. The support portion 123 may include a plurality of support portions 123. The plurality of support portions 123 may be apart from each other in the first direction (e.g., the x-axis direction). In an embodiment, lengths of the plurality of support portions 123 in the second direction (e.g., the y-axis direction) are the same as each other. Lengths of the plurality of support portions 123 in the third direction (e.g., the z-axis direction) may be the same as each other. However, lengths of the plurality of support portions 123 in the first direction (e.g., the x-axis direction) may vary.

Graduations displaying positions of the plurality of support portions 123 may be marked on the display portion 122. The graduations may be marked on the display portion 122 in the first direction (e.g., the x-axis direction). Accordingly, during an operation of arranging the support portion 123 on the base plate 121, an exact position of the support portion 123 and a distance between the plurality of support portions 123 may be discovered through the graduations.

For example, the support portion 123 may include a first support portion 123-1, a second support portion 123-2, a third support portion 123-3, and a fourth support portion 123-4 that are spaced apart from one another in the first direction (e.g., the x-axis direction). Lengths of at least two of the first support portion 123-1, the second support portion 123-2, the third support portion 123-3, and the fourth support portion 123-4 in the first direction (e.g., the x-axis direction) may be different from each other. The first support portion 123-1, the second support portion 123-2, the third support portion 123-3, and the fourth support portion 123-4 may be arranged at exact positions on the base plate 121 through the graduations marked on the display portion 122. A separation space may be formed between the first support portion 123-1 and the second support portion 123-2, between the second support portion 123-2 and the third support portion 123-3, and between the third support portion 123-3 and the fourth support portion 123-4.

Figure 13:
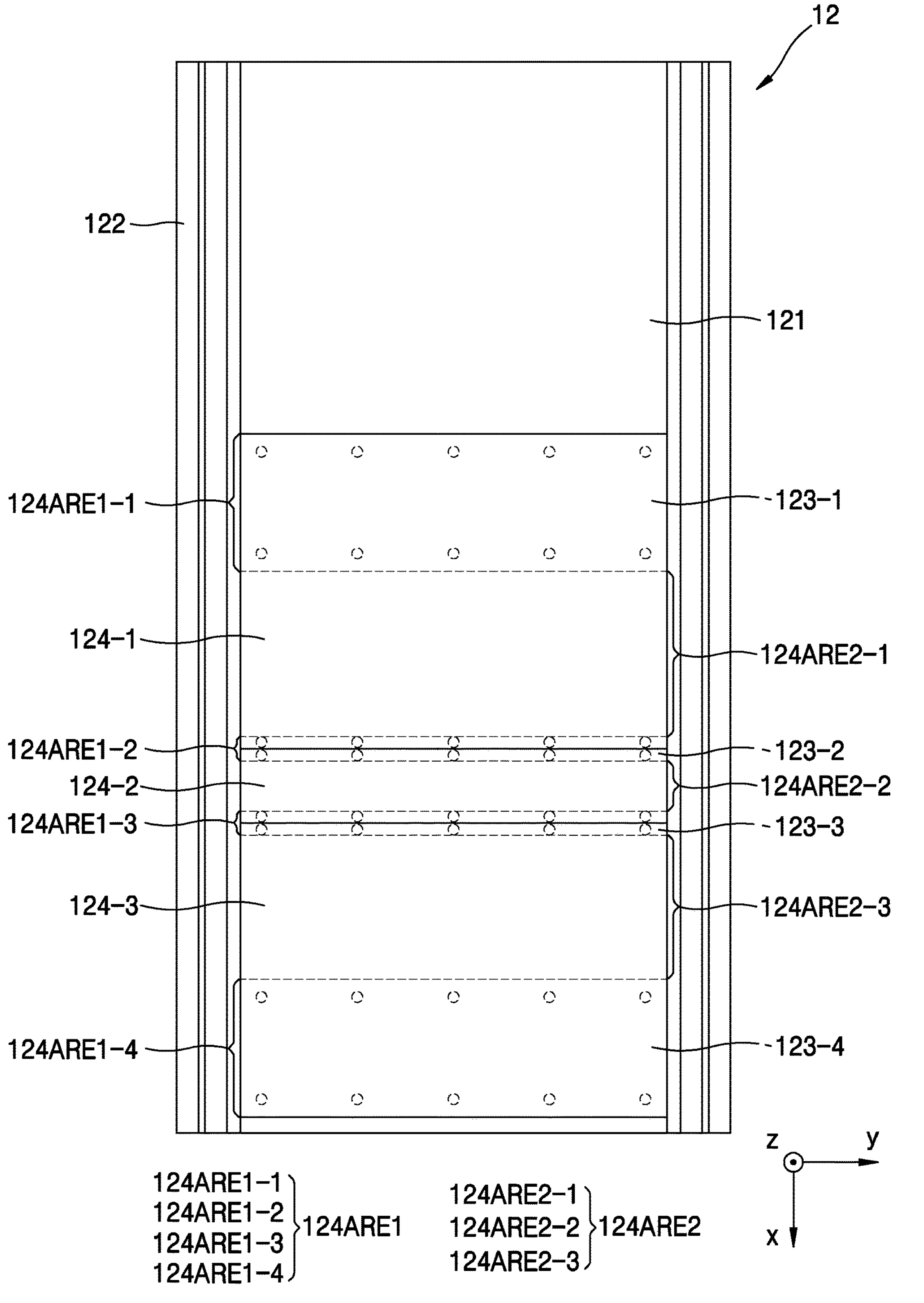
Figure 14:
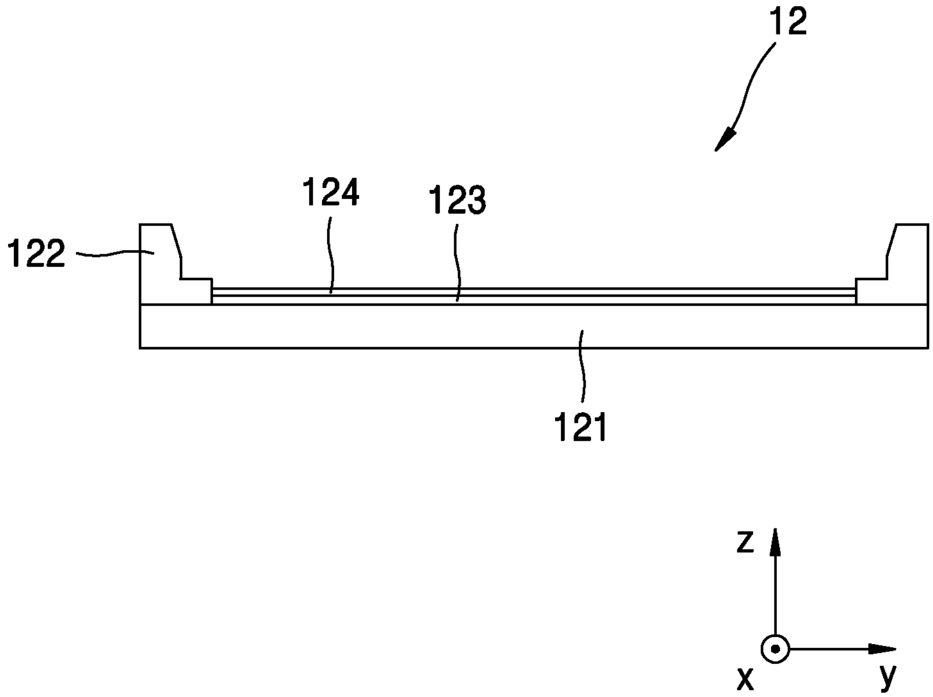

Referring to FIGS. 13 and 14, the cover plate 124 may be disposed on the support portion 123 to be detachable from the support portion 123. Due to the first magnet member 123*m* of the support portion 123, magnetic force may be formed between the support portion 123 and the cover plate 124. That is, an attractive force may act between the support portion 123 and the cover plate 124. Accordingly, the support portion 123 and the cover plate 124 may be detachably fixed to each other.

The cover plate 124 may have a plate shape or a rectangular shape. In an embodiment, a length of the cover plate 124 in the second direction (e.g., the y-axis direction) and the distance between the two display portions 122 correspond to each other. A plurality of the cover plates 124 may be present. The plurality of cover plates 124 may adjoin each other. In an embodiment, lengths of the plurality of cover plates 124 in the second direction (e.g., the y-axis direction) are the same as each other. Lengths of the plurality of cover plates 124 in the third direction (e.g., the z-axis direction) may be the same as each other. Lengths of the plurality of cover plates 124 in the first direction (e.g., the x-axis direction) may vary.

For example, the cover plate 124 may include a first cover plate 124-1, a second cover plate 124-2, and a third cover plate 124-3 that are spaced apart from one another in the first direction (e.g., the x-axis direction). In an embodiment, lengths of at least two of the first cover plate 124-1, the second cover plate 124-2, and the third cover plate 124-3 in the first direction (e.g., the x-axis direction) are different from each other. The first cover plate 124-1 may overlap the first support portion 123-1 and the second support portion 123-2. The second cover plate 124-2 may overlap the second support portion 123-2 and the third support portion 123-3. The third cover plate 124-3 may overlap the third support portion 123-3 and the fourth support portion 123-4. A boundary between the first cover plate 124-1 and the second cover plate 124-2 may be disposed on the second support portion 123-2. A boundary between the second cover plate 124-2 and the third cover plate 124-3 may be disposed on the third support portion 123-3.

The cover plate 124 may include a plurality of overlapping areas 124ARE1 overlapping the plurality of support portions 123 and an evaluation area 124ARE2 arranged between the plurality of overlapping areas 124ARE1. In an embodiment, the cover plate 124 is in contact with the support portion 123 in the overlapping area 124ARE1 and is not in contact with the support portion 123 in the evaluation area 124ARE2.

For example, the overlapping area 124ARE1 may include a first overlapping area 124ARE1-1 overlapping the first support portion 123-1, a second overlapping area 124ARE1-2 overlapping the second support portion 123-2, a third overlapping area 124ARE1-3 overlapping the third support portion 123-3, and a fourth overlapping area 124ARE1-4 overlapping the fourth support portion 123-4. The evaluation area 124ARE2 may include a first evaluation area 124ARE2-1 arranged between the first overlapping area 124ARE1-1 and the second overlapping area 124ARE1-2, a second evaluation area 124ARE2-2 arranged between the second overlapping area 124ARE1-2 and the third overlapping area 124ARE1-3, and a third evaluation area 124ARE2-3 arranged between the third overlapping area 124ARE1-3 and the fourth overlapping area 124ARE1-4.

Figure 15:
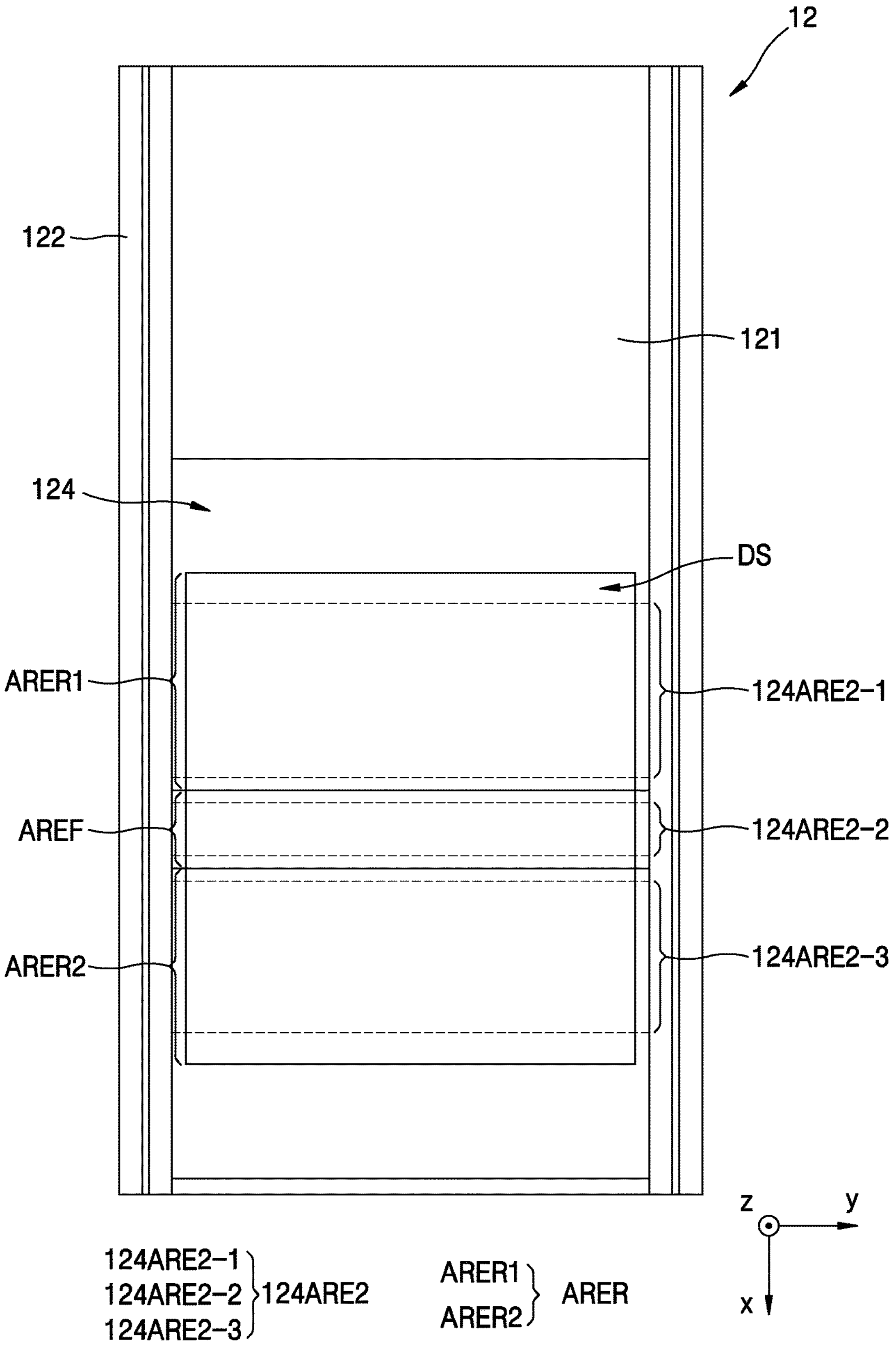
Figure 16:
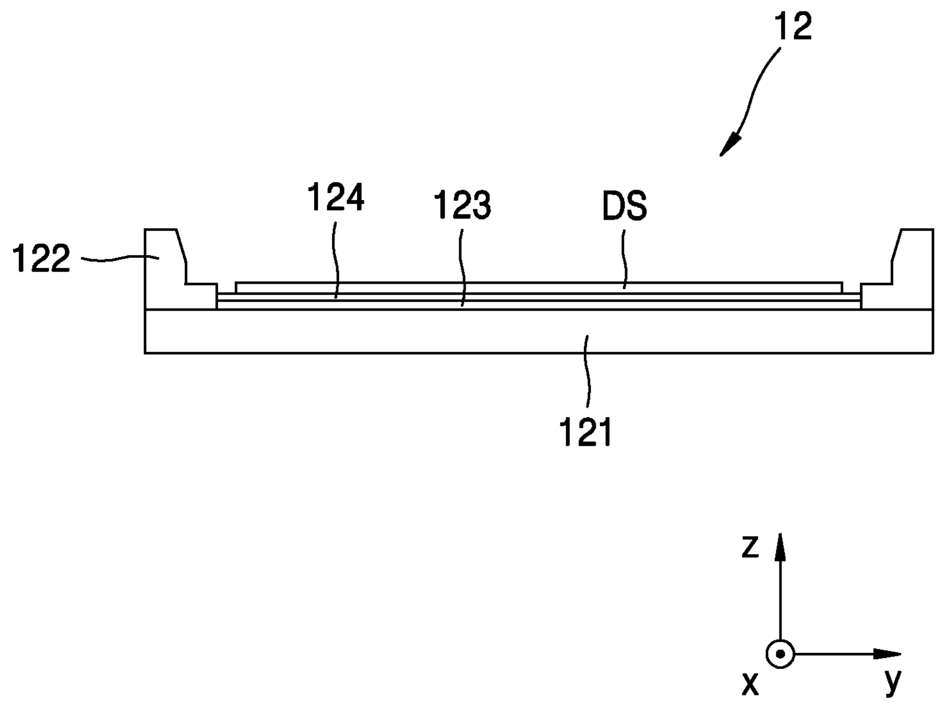

Referring to FIGS. 15 and 16, the display panel DS may be disposed on the cover plate 124. An area where the impact portion 13 applies an impact to the display panel DS may overlap the evaluation area 124ARE2. For example, the impact portion 13 may apply an impact to an area overlapping the first evaluation area 124ARE2-1, an area overlapping the second evaluation area 124ARE2-2, and an area overlapping the third evaluation area 124ARE2-3 of the display panel DS.

The display panel DS may include a rigid area ARER and a folding area AREF. The rigid area ARER may be a non-folding area. The folding area AREF may be an area arranged adjacent to the rigid area ARER to be foldable. For example, the rigid area ARER may include a first rigid area ARER1 and a second rigid area ARER2. The folding area AREF may be arranged between the first rigid area ARER1 and the second rigid area ARER2.

A plurality of the evaluation areas 124ARE2 may be present. The rigid area ARER may overlap one of the plurality of evaluation areas 124ARE2, and the folding area AREF may overlap another one of the plurality of evaluation areas 124ARE2. For example, the first rigid area ARER1 may overlap the first evaluation area 124ARE2-1, the folding area AREF may overlap the second evaluation area 124ARE2-2, and the second rigid area ARER2 may overlap the third evaluation area 124ARE2-3. That is, a boundary between the first rigid area ARER1 and the folding area AREF may be arranged between the first evaluation area 124ARE2-1 and the second evaluation area 124ARE2-2, and a boundary between the folding area AREF and the second rigid area ARER2 may be arranged between the second evaluation area 124ARE2-2 and the third evaluation area 124ARE2-3.

Referring to FIGS. 9 to 16, as elements of the jig portion 12 are detachably connected to each other, the structure may be changed in correspondence with various display forms. For example, unlike those shown in FIGS. 9 to 16, when the display panel DS includes three rigid areas ARER and two folding areas AREF, one more support portions 123 may be added.

In addition, when the plurality of support portions 123 support the cover plate 124, a phenomenon in which the cover plate 124 is sagged or bent by gravity may be reduced. Accordingly, accuracy of the inspection device 1 for a display apparatus may be increased.

Figure 17:
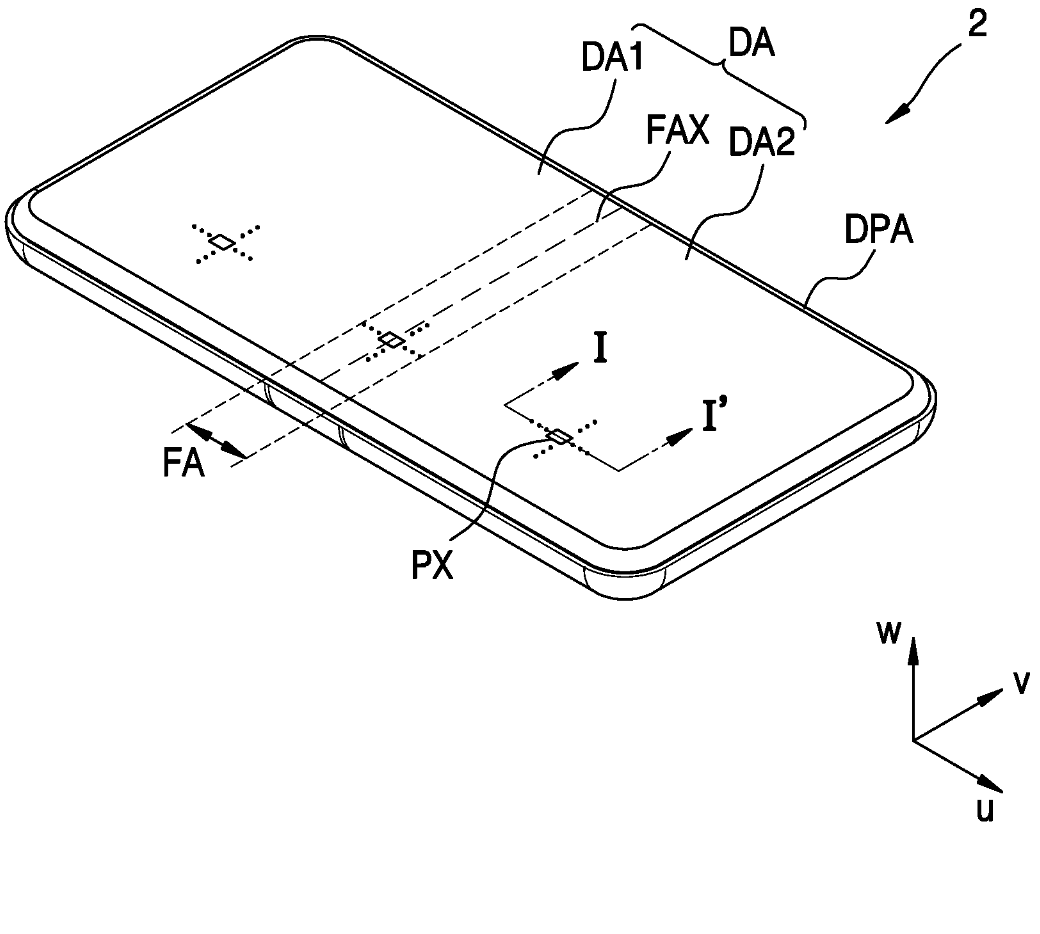
FIG. 17 is a schematic perspective view of a display apparatus according to an embodiment.

FIG. 17 is a schematic perspective view of a display apparatus 2 according to an embodiment.

Referring to FIG. 17, the display apparatus 2 is an apparatus for displaying a moving image or a still image, and may be used as the display screen of not only portable electronic devices, such as a mobile phone, a smartphone, a tablet personal computer (PC), a mobile communication terminal, an electronic notebook, an e-book, a portable multimedia player (PMP), a navigation system, and an ultra-mobile PC (UMPC), but also various products, such as a television, a notebook computer, a monitor, a billboard, and the Internet of things (IoT).

In addition, the display apparatus 2 may be used in wearable devices, such as a smartwatch, a watch phone, a glasses-type display, and a head-mounted display (HMD). In addition, the display apparatus 2 may be used as a car's instrument panel, a center information display (CID) placed on a car's center fascia or dashboard, a room mirror display replacing a car's side mirror, or a display placed on the back of a front seat as entertainment for a car's rear seat. FIG. 17 illustrates the display apparatus 2 being used as a smartphone for convenience of description.

The display apparatus 2 may include a display area DA and a peripheral area DPA located outside the display area DA. In addition, the display apparatus 2 may include a folding area FA, and the display area DA may include a first display area DA1 and a second display area DA2 spaced apart from each other with the folding area FA therebetween. The peripheral area DPA is a non-display area in which display elements are not arranged.

In an embodiment, the display area DA and the folding area FA may display images individually or together. More specifically, pixels PX may be arranged in the display area DA and the folding area FA. Accordingly, the display apparatus 2 may provide an image by using the pixels PX arranged in the display area DA and the folding area FA.

The display apparatus 2 may have a rectangular shape in a plan view. For example, as shown in FIG. 17, the display apparatus 2 may have a planar shape of a rectangle having short sides in the v-axis direction and long sides in the u-axis direction. Corners at which the short sides in the v-axis direction and the long sides in the u-axis direction meet each other may be rounded to have a certain curvature or may be right-angled. However, a planar shape of the display apparatus 2 is not limited to a rectangular shape and may be any of other polygonal, elliptical, or atypical shapes.

The display apparatus 2 described above may have various forms. In an embodiment, the display apparatus 2 may have a shape that is not able to change. In an embodiment, the display apparatus 2 may be at least partially foldable. In this case, the display apparatus 2 may be of an in-folding type or an out-folding type. Hereinafter, a case where the display apparatus 2 is of an in-folding type will be mainly described for convenience.

In the above case, the display apparatus 2 may be folded around a folding axis FAX in the folding area FA. In this case, when the display apparatus 2 is folded around the folding axis FAX, a size of the display area DA may be reduced, and when the display apparatus 2 is completely unfolded, the display area DA may display an image while forming a flat surface, thereby implementing a large screen.

The display apparatus 2 described with reference to FIG. 17 may correspond to the display panel DS described with reference to FIGS. 1 to 16. The display area DA described with reference to FIG. 17 may correspond to the rigid area ARER described with reference to FIG. 15. That is, the first display area DA1 described with reference to FIG. 17 may correspond to the first rigid area ARER1 described with reference to FIG. 15. In addition, the second display area DA2 described with reference to FIG. 17 may correspond to the second rigid area ARER2 described with reference to FIG. 15. In addition, the folding area FA described with reference to FIG. 17 may correspond to the folding area AREF described with reference to FIG. 15.

Figure 18:
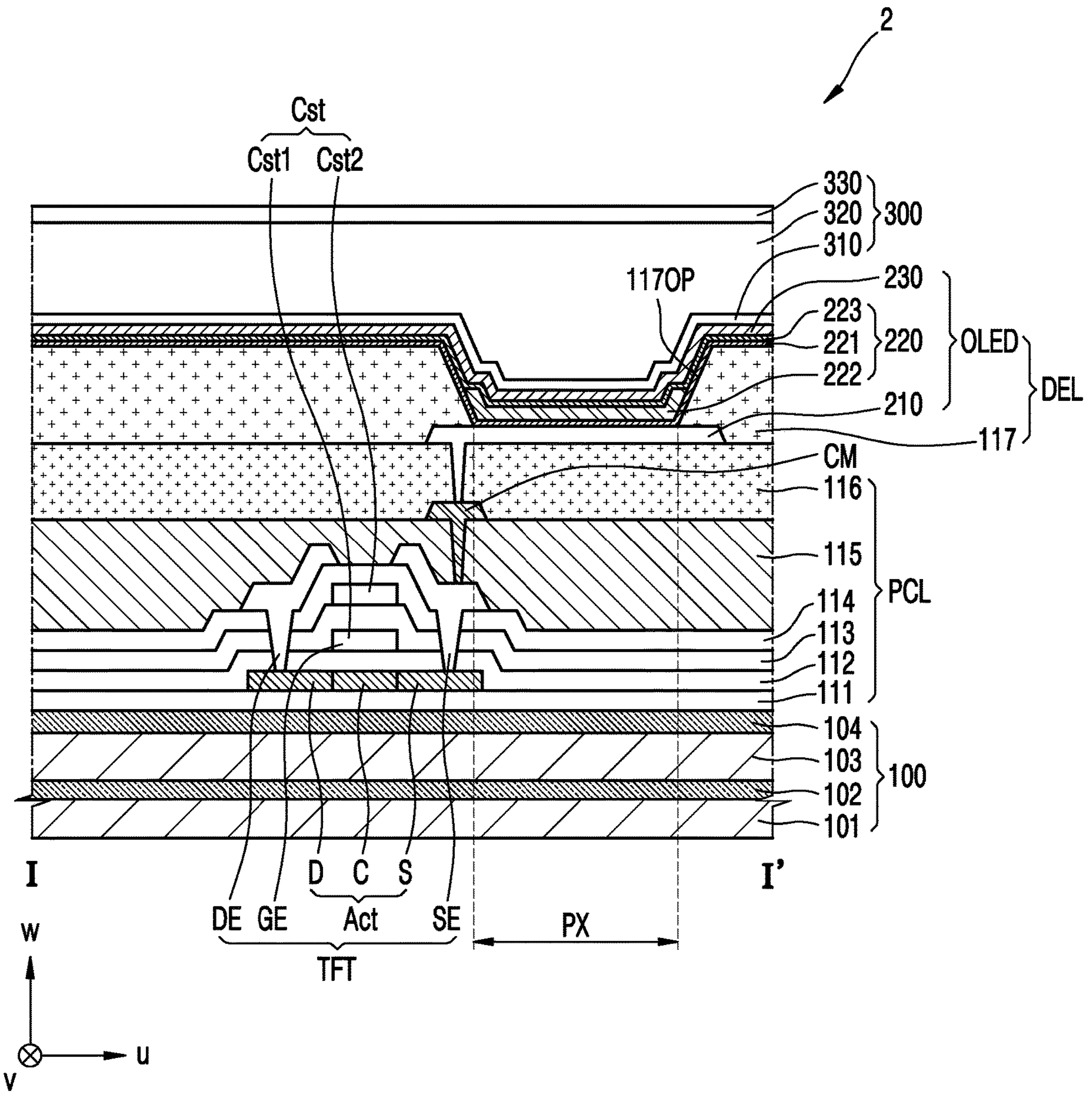
FIG. 18 is a schematic cross-sectional view of a display apparatus according to an embodiment.

FIG. 18 is a schematic cross-sectional view of the display apparatus 2 according to an embodiment, and may correspond to a cross-section of the display apparatus 2, taken along line I-I' of FIG. 17.

Referring to FIG. 18, the display apparatus 2 may include a stacked structure of a substrate 100, a pixel circuit layer PCL, a display element layer DEL, and an encapsulation layer 300.

The substrate 100 may have a multi-layer structure including a base layer and an inorganic layer, the base layer including polymer resin. For example, the substrate 100 may include a base layer including polymer resin, and a barrier layer of an inorganic insulating layer. For example, the substrate 100 may include a first base layer 101, a first barrier layer 102, a second base layer 103, and a second barrier layer 104 that are sequentially stacked on one another. The first base layer 101 and the second base layer 103 may include polyimide (PI), polyethersulfone (PES), polyarylate, polyetherimide (PEI), polyethylene naphthalate (PEN), polyethylene terephthalate (PET), polyphenylene sulfide (PPS), polycarbonate, cellulose triacetate (TAC) and/or cellulose acetate propionate (CAP). The first barrier layer 102 and the second barrier layer 104 may include an inorganic insulating material, such as silicon oxide, silicon oxynitride and/or silicon nitride. The substrate 100 may be flexible.

The pixel circuit layer PCL may be disposed on the substrate 100. FIG. 18 shows the pixel circuit layer PCL including a thin-film transistor TFT, and a buffer layer 111, a first gate insulating layer 112, a second gate insulating layer 113, an interlayer insulating layer 114, a first planarization insulating layer 115, and a second planarization insulating layer 116 disposed under and/or on elements of the thin-film transistor TFT.

The buffer layer 111 may reduce or prevent penetration of foreign materials, moisture, or external air from below the substrate 100 and may provide a flat surface on the substrate 100. The buffer layer 111 may include an inorganic insulating material, such as silicon oxide, silicon oxynitride and/or silicon nitride, and may have a single-layer or multi-layer structure including the above-described material.

The thin-film transistor TFT on the buffer layer 111 may include a semiconductor layer Act, and the semiconductor layer Act may include polysilicon (poly-Si). Alternatively, the semiconductor layer Act may include amorphous silicon (a-Si), may include an oxide semiconductor, or may include an organic semiconductor, etc. The semiconductor layer Act may include a channel region C, and a drain region D and a source region S respectively arranged on both sides of the channel region C. A gate electrode GE may overlap the channel region C.

The gate electrode GE may include a low-resistance metal material. The gate electrode GE may include a conductive material including molybdenum (Mo), aluminum (Al), copper (Cu), titanium (Ti), etc., and may have a multi-layer or single-layer structure including the above-described material.

The first gate insulating layer 112 between the semiconductor layer Act and the gate electrode GE may include an inorganic insulating material, such as silicon oxide ($SiO_2$), silicon nitride ($SiN_X$), silicon oxynitride (SiON), aluminum oxide ($Al_2O_3$), titanium oxide ($TiO_2$), tantalum oxide ($Ta_2O_5$), hafnium oxide ($HfO_2$), or zinc oxide ($ZnO_X$). Zinc oxide ($ZnO_X$) may be zinc oxide (ZnO) and/or zinc peroxide ($ZnO_2$).

The second gate insulating layer 113 may cover the gate electrode GE. Similarly to the first gate insulating layer 112, the second gate insulating layer 113 may include an inorganic insulating material, such as silicon oxide ($SiO_2$), silicon nitride ($SiN_X$), silicon oxynitride (SiON), aluminum oxide ($Al_2O_3$), titanium oxide ($TiO_2$), tantalum oxide ($Ta_2O_5$), hafnium oxide ($HfO_2$), or zinc oxide ($ZnO_X$). Zinc oxide ($ZnO_X$) may be zinc oxide (ZnO) and/or zinc peroxide ($ZnO_2$).

A top electrode Cst2 of a storage capacitor Cst may be disposed on the second gate insulating layer 113. The top electrode Cst2 may overlap the gate electrode GE therebelow. In this regard, the gate electrode GE and the top electrode Cst2 overlapping each other with the second gate insulating layer 113 therebetween may constitute the storage capacitor Cst. That is, the gate electrode GE may serve as a bottom electrode Cst1 of the storage capacitor Cst.

As described above, the storage capacitor Cst and the thin-film transistor TFT may overlap each other. In an embodiments, the storage capacitor Cst does not overlap the thin-film transistor TFT.

The top electrode Cst2 may include aluminum (Al), platinum (Pt), palladium (Pd), silver (Ag), magnesium (Mg), gold (Au), nickel (Ni), neodymium (Nd), iridium (Ir), chromium (Cr), calcium (Ca), molybdenum (Mo), titanium (Ti), tungsten (W) and/or copper (Cu), and may have a single-layer or multi-layer structure including the above-described material.

The interlayer insulating layer 114 may cover the top electrode Cst2. The interlayer insulating layer 114 may include silicon oxide (SiO2), silicon nitride (SiNX), silicon oxynitride (SiON), aluminum oxide (Al2O3), titanium oxide (TiO2), tantalum oxide (Ta2O5), hafnium oxide (HfO2), or zinc oxide (ZnOX). Zinc oxide (ZnOX) may be zinc oxide (ZnO) and/or zinc peroxide (ZnO2). The interlayer insulating layer 114 may have a single-layer or multi-layer structure including the above-described inorganic insulating material.

A drain electrode DE and a source electrode SE may each be on the interlayer insulating layer 114. The drain electrode DE and the source electrode SE may be respectively connected to the drain region D and the source region S through contact holes formed in the insulating layers thereunder. The drain electrode DE and the source electrode SE may include a highly conductive material. The drain electrode DE and the source electrode SE may include a conductive material including molybdenum (Mo), aluminum (Al), copper (Cu), titanium (Ti), etc., and may have a multi-layer or single-layer structure including the above-described material. In an embodiment, the drain electrode DE and the source electrode SE may have a multi-layer structure of titanium (Ti)/aluminum (Al)/titanium (Ti).

The first planarization insulating layer 115 may cover the drain electrode DE and the source electrode SE. The first planarization insulating layer 115 may include an organic insulating material, such as a general commercial polymer, such as polymethylmethacrylate (PMMA) or polystyrene (PS), a polymer derivative having a phenol-based group, an acryl-based polymer, an imide-based polymer, an aryl ether-based polymer, an amide-based polymer, a fluorine-based polymer, a p-xylene-based polymer, a vinyl alcohol-based polymer, and a blend thereof.

The second planarization insulating layer 116 may be disposed on the first planarization insulating layer 115. The second planarization insulating layer 116 may include the same material as the first planarization insulating layer 115, and may include an organic insulating material, such as a general commercial polymer, such as PMMA or PS, a polymer derivative having a phenol-based group, an acryl-based polymer, an imide-based polymer, an aryl ether-based polymer, an amide-based polymer, a fluorine-based polymer, a p-xylene-based polymer, a vinyl alcohol-based polymer, and a blend thereof.

The display element layer DEL may be disposed on the pixel circuit layer PCL having the above-described structure. The display element layer DEL may include an organic light-emitting diode OLED as a display element (that is, a light-emitting element), and the organic light-emitting diode OLED may include a stacked structure of a pixel electrode 210, an intermediate layer 220, and a common electrode 230. The organic light-emitting diode OLED, for example, may emit red, green, or blue light, or may emit red, green, blue, or white light. The organic light-emitting diode OLED may emit light through an emission area, and the emission area may be defined as a pixel PX.

The pixel electrode 210 of the organic light-emitting diode OLED may be electrically connected to the thin-film transistor TFT through contact holes formed in the second planarization insulating layer 116 and the first planarization insulating layer 115 and a contact metal CM disposed on the first planarization insulating layer 115.

The pixel electrode 210 may include conductive oxide, such as indium tin oxide (ITO), indium zinc oxide (IZO), zinc oxide (ZnO), indium oxide (In2O3), indium gallium oxide (IGO), or aluminum zinc oxide (AZO). In another embodiment, the pixel electrode 210 may include a reflective layer including silver (Ag), magnesium (Mg), aluminum (Al), platinum (Pt), palladium (Pd), gold (Au), nickel (Ni), neodymium (Nd), iridium (Ir), chromium (Cr), or a compound thereof. In another embodiment, the pixel electrode 210 may further include a layer formed of ITO, IZO, ZnO, or In2O3 on/under the above-described reflective layer.

A bank layer 117 including an opening 117OP exposing a central portion of the pixel electrode 210 may be disposed on the pixel electrode 210. The bank layer 117 may include an organic insulating material and/or an inorganic insulating material. The opening 117OP may define an emission area of light emitted from the organic light-emitting diode OLED. For example, a size/width of the opening 117OP may correspond to a size/width of the emission area. Accordingly, a size and/or width of the pixel PX may depend on a size and/or width of the corresponding opening 117OP of the bank layer 117.

The intermediate layer 220 may include an emission layer 222 corresponding to the pixel electrode 210. The emission layer 222 may include a polymer organic material or low-molecular weight organic material emitting light of a certain color. Alternatively, the emission layer 222 may include an inorganic light-emitting material or quantum dots.

In an embodiment, the intermediate layer 220 may include a first functional layer 221 and a second functional layer 223 respectively disposed under and on the emission layer 222. The first functional layer 221 may include, for example, a hole transport layer (HTL), or an HTL and a hole injection layer (HIL). The second functional layer 223 is an element disposed on the emission layer 222, and may include an electron transport layer (ETL) and/or an electron injection layer (EIL). Like the common electrode 230 described below, the first functional layer 221 and/or the second functional layer 223 may be a common layer entirely covering the substrate 100.

The common electrode 230 may be disposed above the pixel electrode 210 and may overlap the pixel electrode 210. The common electrode 230 may include a conductive material having a low work function. For example, the common electrode 230 may include a (semi)transparent layer including silver (Ag), magnesium (Mg), aluminum (Al), platinum (Pt), palladium (Pd), gold (Au), nickel (Ni), neodymium (Nd), iridium (Ir), chromium (Cr), lithium (Li), calcium (Ca), or an alloy thereof. Alternatively, the common electrode 230 may further include a layer, such as ITO, IZO, ZnO, or In2O3, on a (semi)transparent layer including the above-described material. The common electrode 230 may be integrally formed to entirely cover the substrate 100.

The encapsulation layer 300 may be disposed on the display element layer DEL and may cover the display element layer DEL. The encapsulation layer 300 may include at least one inorganic encapsulation layer and at least one organic encapsulation layer, and as an embodiment, FIG. 18 shows the encapsulation layer 300 including a first inorganic encapsulation layer 310, an organic encapsulation layer 320, and a second inorganic encapsulation layer 330 that are sequentially stacked on one another.

The first inorganic encapsulation layer 310 and the second inorganic encapsulation layer 330 may include one or more inorganic materials among aluminum oxide, titanium oxide, tantalum oxide, hafnium oxide, zinc oxide, silicon oxide, silicon nitride, and silicon oxynitride. The organic encapsulation layer 320 may include a polymer-based material. Examples of the polymer-based material may include acryl-based resin, epoxy-based resin, polyimide, and polyethylene. In an embodiment, the organic encapsulation layer 320 may include acrylate. The organic encapsulation layer 320 may be formed by curing a monomer or applying a polymer. The organic encapsulation layer 320 may have transparency.

A touch sensor layer may be disposed on the encapsulation layer 300, and an optical functional layer may be disposed on the touch sensor layer. The touch sensor layer may obtain an external input, for example, coordinate information according to a touch event. The optical functional layer may reduce the reflectivity of light (e.g., external light) incident on the display apparatus from the outside and/or may improve the color purity of light emitted from the display apparatus. In an embodiment, the optical functional layer may include a retarder and/or a polarizer. The retarder may be of a film type or a liquid crystal coating type and may include a λ/2 retarder and/or a λ/4 retarder. The polarizer may also be of a film type or a liquid crystal coating type. The film type may include a stretchable synthetic resin film, and the liquid crystal coating type may include liquid crystals arranged in a certain arrangement. The retarder and the polarizer may further include a protection film.

An adhesive member may be disposed between the touch sensor layer and the optical functional layer. The adhesive member may be a pressure-sensitive adhesive (PSA).

Figure 19:
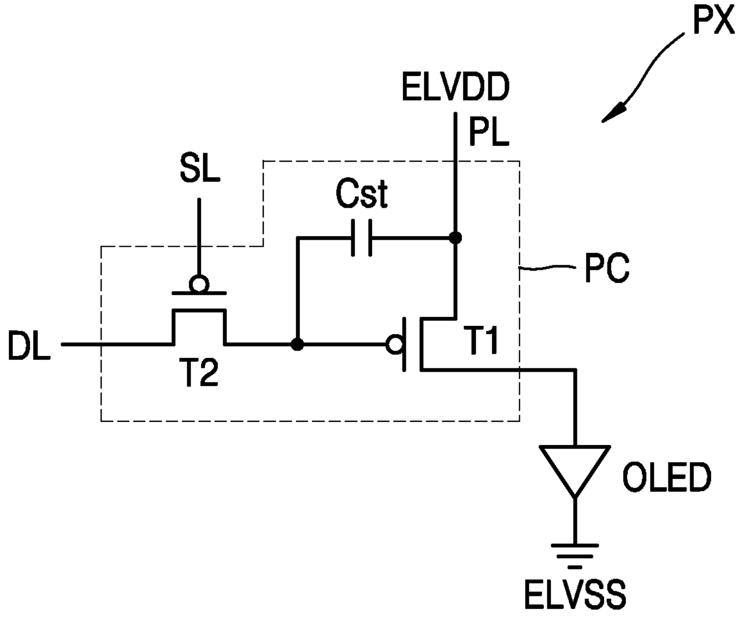
FIG. 19 is an equivalent circuit diagram of one pixel in a display panel according to an embodiment.

FIG. 19 is an equivalent circuit diagram of one pixel PX in a display panel (e.g., display panel DS) according to an embodiment.

Each pixel PX may include a pixel circuit PC and a display element connected to the pixel circuit PC, for example, the organic light-emitting diode OLED. The pixel circuit PC may include a first thin-film transistor T1, a second thin-film transistor T2, and the storage capacitor Cst. Each pixel PX may emit, for example, red, green, blue, or white light, through the organic light-emitting diode OLED.

The second thin-film transistor T2, which is a switching thin-film transistor, may be connected to a scan line SL and a data line DL and may be configured to transmit a data voltage input from the data line DL to the first thin-film transistor T1, based on a switching voltage input from the scan line SL. The storage capacitor Cst may be connected to the second thin-film transistor T2 and a driving voltage line PL and may store a voltage corresponding to a difference between a voltage received from the second thin-film transistor T2 and a first power voltage ELVDD supplied to the driving voltage line PL.

The first thin-film transistor T1, which is a driving thin-film transistor, may be connected to the driving voltage line PL and the storage capacitor Cst, and may be configured to control a driving current flowing through the organic light-emitting diode OLED from the driving voltage line PL, in response to a voltage value stored in the storage capacitor Cst. The organic light-emitting diode OLED may emit light having certain brightness according to the driving current. An opposite electrode (e.g., a cathode) of the organic light-emitting diode OLED may receive a second power voltage ELVSS.

Although FIG. 19 shows the pixel circuit PC including two thin-film transistors and one storage capacitor, the embodiments are not limited thereto. The number of thin-film transistors and the number of storage capacitors may be variously modified according to the design of the pixel circuit PC. For example, the pixel circuit PC may further include four or five or more thin-film transistors in addition to the two thin-film transistors described above.

According to at least one of the embodiments described above, the performance of various types of display panels may be tested quickly and accurately.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure.

What is claimed is:

1. An inspection device for a display apparatus, the inspection device comprising:
- a support;
- a jig portion disposed on the support to enable a display panel to be seated thereon;
- an impact portion configured to apply an impact to the display panel; and
- a movement portion connecting the support and the impact portion to each other and configured to move the impact portion towards the jig portion,
- wherein the jig portion comprises:
  - a base plate;
  - a plurality of support portions arranged on the base plate to be detachable from the base plate; and
  - a cover plate arranged over the plurality of support portions and comprising a plurality of overlapping areas overlapping the plurality of support portions and an evaluation area arranged between the plurality of overlapping areas,
- wherein an area where the impact portion applies the impact to the display panel overlaps the evaluation area.

2. The inspection device of claim 1, wherein each of the plurality of support portions comprises a first magnet member,
- wherein each of the base plate and the cover plate comprises a metal material.

3. The inspection device of claim 1, wherein the jig portion further comprises a display portion arranged on the base plate to be detachable from the base plate, wherein the display portion is marked with graduations displaying positions of the plurality of support portions.

4. The inspection device of claim 3, wherein the display portion comprises a second magnet member, and
- the base plate comprises a metal material.

5. The inspection device of claim 1, wherein the impact portion comprises a drop portion configured to drop a falling object onto the display panel.

6. The inspection device of claim 5, wherein the drop portion stores a plurality of falling objects at the same time.

7. The inspection device of claim 6, wherein at least two of the plurality of falling objects have different shapes from each other.

8. The inspection device of claim 5, wherein the falling object comprises:
- a falling tip configured to hit the display panel; and
- an extension portion extending from the falling tip in one direction.

9. The inspection device of claim 8, wherein a single layer integrally forms the falling tip.

10. The inspection device of claim 8, wherein the falling tip comprises:
- a falling contact portion configured to contact the display panel; and a falling connection portion connecting the falling contact portion and the extension portion to each other and accommodating at least a portion of the falling contact portion.

11. The inspection device of claim 5, wherein the falling object has a sphere shape.

12. The inspection device of claim 1, wherein the impact portion comprises a pressing portion configured to apply a force to the display panel for a determined period of time.

13. The inspection device of claim 12, wherein the pressing portion comprises:

a force sensor comprising a load cell;

a pressing tip configured to contact the display panel; and a pressing movement portion connecting the force sensor and the pressing tip to each other and configured to move the pressing tip in one direction toward the display panel with respect to the force sensor.

14. The inspection device of claim 1, further comprising a controller configured to control the impact portion and the movement portion so that the impact portion applies an impact to the display panel at a previously set position.

15. The inspection device of claim 1, further comprising a driver electrically connected to the display panel and configured to drive the display panel.

16. The inspection device of claim 1, further comprising a measurement portion configured to measure a surface of the display panel after the impact portion applies the impact to the display panel.

17. The inspection device of claim 16, wherein the measurement portion is fixed to the impact portion.

18. The inspection device of claim 1, wherein the movement portion comprises:

a first movement portion configured to move the impact portion in a first direction;

a second movement portion configured to move the impact portion in a second direction crossing the first direction; and a third movement portion configured to move the impact portion in a third direction crossing the first direction and the second direction.

19. The inspection device of claim 1, wherein the jig portion comprises an aluminum material.

20. The inspection device of claim 1, wherein the display panel comprises:

a rigid area; and a folding area arranged adjacent to the rigid area to be foldable, wherein the evaluation area comprises a plurality of evaluation areas, the rigid area overlaps one of the plurality of evaluation areas, and the folding area overlaps another one of the plurality of evaluation areas.

* * * * *